(12) United States Patent
Kang et al.

(10) Patent No.: US 8,039,159 B2
(45) Date of Patent: Oct. 18, 2011

(54) FUEL CELL HAVING ACTUATOR CONTROLLING UNIT AND METHOD OF OPERATING THE SAME

(75) Inventors: Sang-kyun Kang, Yongin-si (KR); Jae-yong Lee, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 856 days.

(21) Appl. No.: 11/782,254

(22) Filed: Jul. 24, 2007

(65) Prior Publication Data

US 2008/0063905 A1    Mar. 13, 2008

(30) Foreign Application Priority Data

Sep. 13, 2006  (KR) .................. 10-2006-0088693

(51) Int. Cl.
- H01M 8/04 (2006.01)
- H01M 2/38 (2006.01)
- H01M 2/40 (2006.01)
- H01M 8/24 (2006.01)

(52) U.S. Cl. ........ 429/443; 429/448; 429/449; 429/454; 429/457; 429/515

(58) Field of Classification Search .................. 429/13, 429/22, 23, 443, 448, 449, 454, 457, 515
See application file for complete search history.

(56) References Cited

U.S. PATENT DOCUMENTS

| | | | | |
|---|---|---|---|---|
| 6,146,781 A * | 11/2000 | Surampudi et al. | ........... | 429/506 |
| 6,873,157 B2 * | 3/2005 | Smedley et al. | ........... | 324/432 |
| 2002/0145532 A1 | 10/2002 | Scheible et al. | | |
| 2004/0121198 A1 * | 6/2004 | Xie | ............... | 429/13 |
| 2005/0115312 A1 | 6/2005 | Curello et al. | | |
| 2005/0119842 A1 | 6/2005 | Clingerman et al. | | |
| 2006/0063053 A1 | 3/2006 | Higashionji et al. | | |
| 2007/0072023 A1 | 3/2007 | Nakamura et al. | | |
| 2007/0092770 A1 | 4/2007 | Obata et al. | | |
| 2007/0104995 A1 | 5/2007 | Kajitani et al. | | |

FOREIGN PATENT DOCUMENTS

| | | |
|---|---|---|
| JP | 07-052425 A | 2/1995 |
| JP | 2003-331885 A | 11/2003 |
| JP | 2005-32603 | 2/2005 |
| JP | 2006-114487 A | 4/2005 |
| JP | 2005-166673 A | 6/2005 |
| JP | 2005-294065 A | 10/2005 |
| JP | 2006-047064 A | 2/2006 |
| JP | 2006-345594 A | 12/2006 |
| WO | WO 2004/114450 A1 | 12/2004 |
| WO | WO 2005/045975 | 5/2005 |
| WO | WO 2005/099007 | 10/2005 |

OTHER PUBLICATIONS

Search report issued by the European Patent Office on Dec. 20, 2007.
Chinese Office Action dated Mar. 26, 2010, in corresponding Chinese Patent Application No. 2007100965777.
Chinese Office Action in CN 200710096577.7 dated Nov. 12, 2010 (Kang), Chinese Office Action from prosecution of corresponding Chinese application.
Chinese Office Action in CN 200710096577.7, dated Mar. 9, 2011 (Kang), Chinese Office Action from prosecution of corresponding Chinese application.

* cited by examiner

Primary Examiner — Patrick Ryan
Assistant Examiner — Julian Anthony
(74) Attorney, Agent, or Firm — Lee & Morse, P.C.

(57) ABSTRACT

A fuel cell includes a fuel cell stack, a buffer, an actuator, and a control circuit. The control circuit controls the operation of the actuator according to a reference value of a reference volume of fuel disposed in the buffer. The fuel cell is operated by measuring a value corresponding to a volume of fuel disposed in the buffer, comparing the value with a reference value, and operating the actuator according to a result of the comparison.

21 Claims, 3 Drawing Sheets

FUEL CELL HAVING ACTUATOR CONTROLLING UNIT AND METHOD OF OPERATING THE SAME

CROSS-REFERENCE TO RELATED APPLICATIONS

This application claims the benefit of Korean Patent Application No. 2006-88693, filed on Sep. 13, 2006, in the Korean Intellectual Property Office, the disclosure of which is incorporated herein in its entirety by reference.

BACKGROUND OF THE INVENTION

1. Field of the Invention

Aspects of the present invention relate to a fuel cell, and more particularly, to a fuel cell having an actuator control unit and a method of operating the same.

2. Description of the Related Art

A fuel cell system is an apparatus that generates energy using fuel such as methanol. The fuel cell system generally includes a fuel cell and a cartridge. The fuel cell is an electricity generation device that generates electrical energy by reacting hydrogen from a fuel and oxygen from the air. The cartridge is a fuel tank that supplies the fuel to the fuel cell.

FIG. 1 illustrates the structure of a conventional fuel cell system SS1. Referring to FIG. 1, a fuel cell 10 includes a fuel cell stack 10A, a buffer 10B, and an actuator 10C. The fuel cell stack 10A generates electricity and includes a plurality of unit cells. The actuator 10C delivers fuel from the cartridge 12 to the buffer 10B. When the cartridge 12, which supplies fuel to the actuator 10C, is regarded as primary fuel storage of the fuel cell system SS1, the buffer 10B can be secondary fuel storage. The buffer 10B temporarily stores the fuel supplied by the actuator 10C and supplies an amount of the fuel to meet the needs of the fuel cell stack 10A. Since the amount of fuel instantaneously used by a load on the fuel cell system SS1 is variable, the amount of fuel consumed by the fuel cell stack 10A varies. The buffer 10B supplies the fuel to the fuel cell stack 10A corresponding to the amount of fuel consumption of the fuel cell stack 10A, which varies at each moment.

The fuel amount consumed by the fuel cell stack 10A can be greater than the amount of fuel supplied from the actuator 10C to the buffer 10B. In other words, the amount of fuel output from the buffer 10B can be greater than the amount of fuel input to the buffer 10B. As the buffer 10B is used as the secondary fuel storage, the buffer 10B is able to compensate when the amount of fuel output from the buffer 10B is greater than the amount of fuel input to the buffer 10B for a period of time.

However, when the amount of fuel output from the buffer 10B is continuously greater than the amount of fuel input to the buffer 10B, even when the buffer 10B is regarded as the secondary fuel storage, the buffer 10B may not be able to provide a necessary amount of fuel to the fuel cell stack 10A. In such a case, the buffer 10B may run out of fuel to supply to the fuel cell stack 10A and portions of the buffer 10B may become dry.

In contrast, the amount of fuel consumed by the fuel cell stack 10A and supplied from the buffer 10B can be less than the amount of fuel input to the buffer 10B. If such a case is not continuous or not continuous for an extended period of time, the buffer 10B can compensate if the buffer 10B is not full so that the buffer 10B has fuel storage capacity to accept the greater input of fuel than output. However, when the buffer 10B is completely filled with fuel, the amount of fuel input from the actuator 10C to the buffer 10B is supplied to the fuel cell stack 10A, resulting in the fuel being excessively supplied to the fuel cell stack 10A.

When the fuel cell system SS1 is in an off state, the fuel remaining in the fuel cell stack 10A continuously reacts. As a result, the performance of the fuel cell stack 10a may be degraded. Furthermore, when the fuel cell system is turned off in a state in which the fuel cell stack 10A is excessively filled with fuel, the degradation of performance of the fuel cell stack 10A can be more serious. This leads to a decreased efficiency and a lower fuel utilization of the fuel cell system SS1.

SUMMARY OF THE INVENTION

To solve the above and/or other problems, aspects of the present invention provide a fuel cell which can supply an appropriate amount of fuel needed by a fuel cell stack and simultaneously prevent a buffer from becoming dry.

Also, aspects of the present invention provide an operation method of the above fuel cell.

According to an aspect of the present invention, a fuel cell including a fuel cell stack, a buffer, and an actuator may comprise a control circuit to control an operation of the actuator according to a reference value corresponding to a reference volume of fuel disposed in the buffer.

The fuel cell stack may be one of a monopolar stack and a bipolar stack.

The reference value may be a resistance or a current.

The buffer may comprise a fuel storage medium to uniformly store fuel in an entire volume thereof regardless of a position of the fuel cell.

The buffer may have a plate shape, a box shape, or a cylindrical shape.

According to another aspect of the present invention, there is provided a method of operating a fuel cell including a fuel cell stack, a buffer, and an actuator, the method including: measuring a measured value corresponding to a volume of fuel disposed in the buffer; comparing a measured value to a reference value; and operating the actuator according to a result of the comparison.

The measured value may be measured using a control circuit.

The comparing of the measured value to the reference value may be performed using a control circuit.

The operating of the actuator may be controlled using a control circuit.

The measured and reference values may be one of resistance and current.

The reference value may correspond to a known volume or a minimum volume of fuel disposed in the buffer to maintain smooth operation of the fuel cell.

The operating of the actuator may comprise turning on the actuator for a given time when the measured resistance is greater than the reference resistance.

The operating of the actuator may comprise turning off the actuator for a given time when the measured resistance is not greater than the reference resistance.

The turning on the actuator may comprise repeating the measuring of the measured resistance of the fuel disposed in the buffer and the comparing of the measured resistance to the reference resistance.

The turning off the actuator may comprise repeating the measuring of the measured resistance of the fuel disposed in the buffer and the comparing of the measured resistance to the reference resistance.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
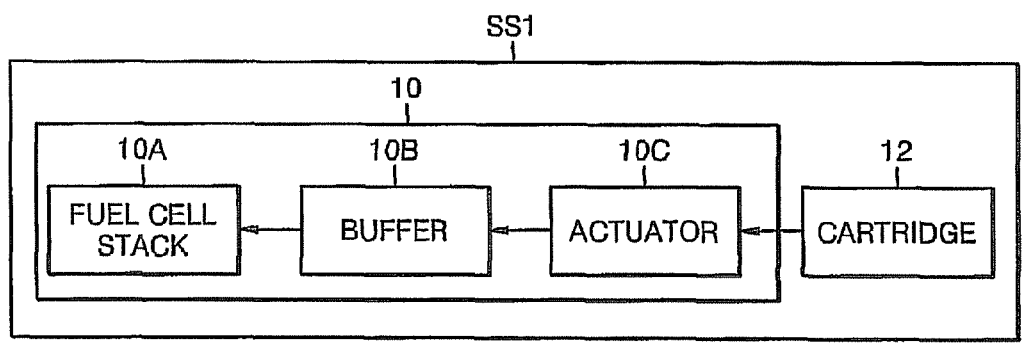
FIG. 1 illustrates the structure of the conventional fuel cell system.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
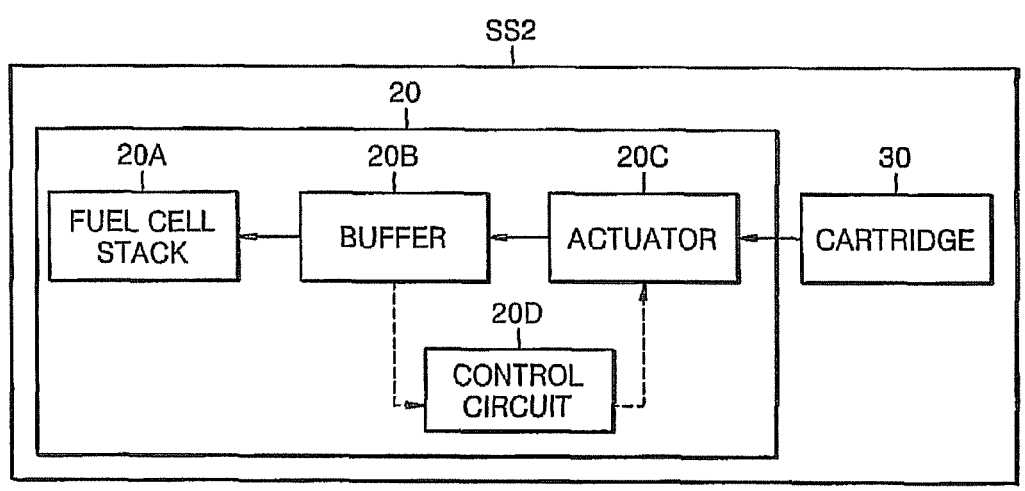
FIG. 2 illustrates the structure of a fuel cell system according to aspects of the present invention.

FIG. 2 illustrates the structure of a fuel cell system according to aspects of the present invention. Referring to FIG. 2, a fuel cell system SS2 includes a fuel cell 20 and a cartridge 30. The fuel cell 20 generates electrical energy using fuel. The cartridge 30 stores fuel that is supplied to the fuel cell 20. When the cartridge 30 is installed in the fuel cell 20, the fuel is supplied to the fuel cell 20 through a valve (not shown). The fuel cell 20 includes a fuel cell stack 20A in which a plurality of unit cells are stacked in either a monopolar stack or a bipolar stack. The monopolar stack has one planar membrane and the plurality of unit cells arranged about the planar membrane. The bipolar stack has the plurality of unit cells stacked vertically such that cooling water and reactants flow vertically along the planar membrane. The fuel cell 20 includes a buffer 20B, which is a secondary fuel storage container, an actuator 20C, and a control circuit 20D. Here, the cartridge 30 may be regarded as a primary fuel storage container. The actuator 20C delivers the fuel from the cartridge 30 to the buffer 20B or ceases the delivery of the fuel from the cartridge 30 to the buffer 20B according to the control process of the control circuit 20D. The buffer 20B stores the fuel delivered by the actuator 20C and supplies an appropriate amount of fuel to the fuel cell stack 20A. The buffer 20B delivers to the fuel cell stack 20A the amount of fuel consumed in the fuel cell stack 20A. The control circuit 20D is a logic circuit that controls the operation of the actuator 20C. The control circuit 20D uses an electric resistance value (hereinafter, referred to as the resistance) as a determining value to control the actuator 20C.

Figure 3:
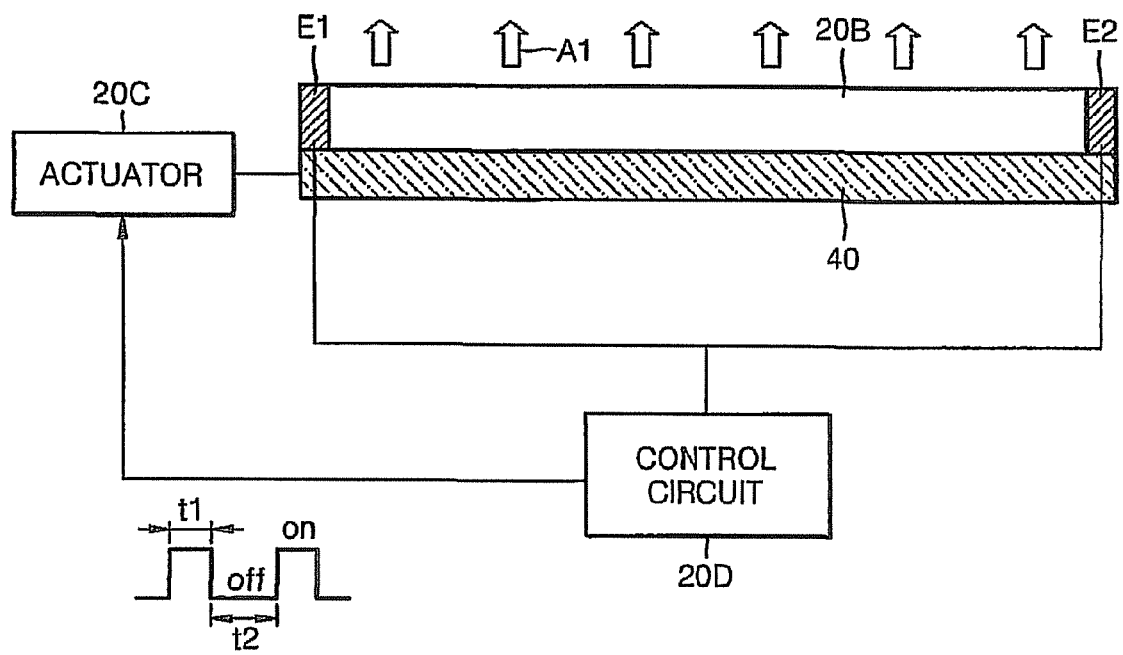
FIG. 3 illustrates the operational relationship among a buffer, an actuator, and a control circuit of the fuel cell of FIG. 2.

To measure the resistance of the buffer 20B, electrodes E1 and E2 are attached at both ends of the buffer 20B as shown in FIG. 3. When the buffer 20B includes an insulation case and a fuel storage medium provided in the case, the electrodes E1 and E2 are provided to contact the fuel storage medium. The fuel storage medium may be a porous material disposed inside the case. Also, when the buffer 20B is an insulating case and the case is filled with fuel, the electrodes E1 and E2 are disposed in the case to contact the fuel. The buffer 20B may have a plate shape, a box shape, or a cylindrical shape.

To measure the resistance of the buffer 20B, the control circuit 20D applies a predetermined voltage to the buffer 20B through the electrodes E1 and E2 and measures current flowing in the buffer 20B. The control circuit 20D calculates the resistance of the buffer 20B using the predetermined voltage applied to the buffer 20B and the measured current. Although the measured current and the resistance of the buffer 20B are actually those of the fuel disposed in the fuel storage medium and the fuel in the insulation case, the measure current and the resistance are referred to as the measured current and the resistance of the buffer 20B for explanatory purposes.

The resistance of the buffer 20B varies according to the amount of fuel existing in the buffer 20B. For example, as the volume of fuel in the buffer 20B decreases, the resistance of the buffer 20B increases. When the volume of fuel in the buffer 20B decreases to an extent that the electrodes E1 and E2 are not electrically connected or not disposed at a conductible distance, the resistance of the buffer 20B increases to infinity. Similarly, when the volume of fuel in the buffer 20B decreases to an extent that the electrodes E1 and E2 are not electrically connected or not disposed at a conductible distance, the current of the fuel disposed in the buffer 20B decreases to zero. When the fuel remains in the buffer 20B, the resistance of the buffer 20B decreases as the amount of the fuel increases. Thus, when the fuel remains in the buffer 20B at an amount of fuel consumed in the fuel storage stack 20A that can be smoothly supplied to the fuel cell stack 20A, the resistance of the buffer 20B at that moment is set to a reference resistance value (hereinafter, referred to as the reference resistance). The reference resistance is based upon a resistance of the buffer 20B when a minimum volume of fuel necessary to maintain operation of the fuel cell stack 20A is disposed in the buffer 20B. For example, the fuel cell stack 20A may require the minimum volume of fuel to maintain smooth operation, and given a volume of the buffer 20B, the buffer 20B may be half full providing a resistance value that is then used as the reference resistance. Or, the reference resistance may be determined when the buffer 20B is ⅓ full of fuel.

Thus, when the resistance of the buffer 20B is greater than the reference resistance and the reference resistance is determined to indicate a volume of fuel disposed to half-fill the buffer 20B, the volume of the fuel disposed in the buffer 20B is less than the half of the internal volume of the buffer 20B. In response, the control circuit 20D operates the actuator 20C until the resistance of the buffer 20B decreases to a value less than the reference resistance. In contrast, when the resistance of the buffer 20b is less than the reference resistance and the reference resistance is determined to indicate a volume of fuel disposed to half-fill the buffer 20B, the amount of fuel distributed in the buffer 20B is more than half of the internal volume of the buffer 20B. In response to such resistance of the buffer 20D, the control circuit 20D stops the operation of the actuator 20C.

When the electrical resistance of the buffer 20B changes, the current of the buffer 20B changes accordingly. Thus, the operation of the actuator 20C can be controlled using the current of the buffer 20B as a control value instead of the resistance of the buffer 20B.

FIG. 3 illustrates the operational relationship among the buffer 20B, the actuator 20C, and the control circuit 20D of the fuel cell of FIG. 2. In FIG. 3, a block arrow A1 indicates the fuel supplied from the buffer 20B to the fuel cell stack 20A.

Referring to FIG. 3, when the resistance of the buffer 20B is greater than the reference resistance, a predetermined operational signal is applied from the control circuit 20D to the actuator 20C. The actuator 20C is turned on and supplies the fuel to the buffer 20B or turned off and does not supply fuel to the buffer 20B according to the operational signal. The fuel supplied by the actuator 20C is supplied to the buffer 20b through a fuel diffusion plate 40 attached to a surface or side of the buffer 20B. The surface or side of the buffer 20B may be the bottom of the buffer 20B with respect to gravity. The fuel supplied by the actuator 20C can be simultaneously supplied throughout the entire area of the surface of the buffer 20B by the fuel diffusion plate 40. The operational signal can be applied for an on time or first time period t1. After the operational signal is applied, the actuator 20C is tuned off for an off or second time period t2 until the fuel supplied to the buffer 20B is uniformly distributed in the entire volume of the buffer 20B. The control circuit 20D measures the resistance of the buffer 20B during the off or second time t2. If the resistance of the buffer 20B is still greater than the reference resistance, then the control circuit 20D transmits the turn on signal to the actuator 20C after the second time t2 to operate the actuator 20C again. The above-described cycle of the control circuit 20D is illustrated in FIG. 3. However, if the resistance of the buffer 20B is less than or equal to the reference resistance after the second time t2, the control circuit 20D continuously maintains the actuator 20C in an off state until the resistance of the buffer 20B is greater than the reference resistance, meaning that the fuel cell stack 20A will decrease the volume of fuel in the buffer 20B until the resistance of the buffer 20B decreases to a value below the reference resistance at which point the control circuit 20D will transmits the turn on signal to the actuator 20C.

The first time t1 is set to be shorter than the second time t2 so as to prevent fuel from being excessively supplied to the buffer 20D. However, aspects of the present invention are not limited thereto. The sum (t1+t2) of the first time t1 and the second time t2 comprises one cycle of the operational signal that the control circuit 20D supplies to the actuator 20C to control the actuator 20C. The cycle may be, for example, 10 seconds. When the cycle is about 10 seconds, the first time t1 is about 3 to 5 seconds while the second time t2 is about 5 to 7 seconds. The cyclic time (t1+t2) can be greater than or less than 10 seconds depending on the resistance of the buffer 20B.

Figure 4:
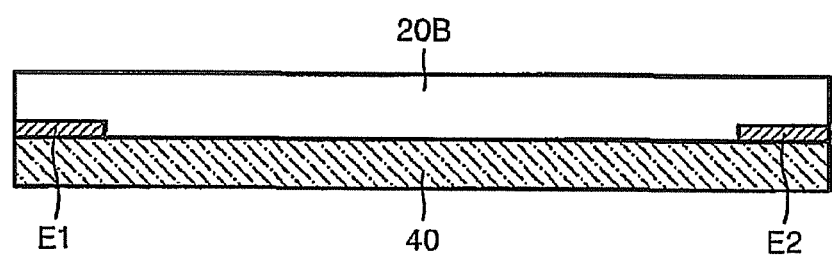
FIG. 4 is a cross-sectional view showing electrodes attached to the buffer of FIG. 3.

The electrodes E1 and E2 can be disposed at a conductible distance to contact or attach to an internal surface of the buffer 20B as shown in FIG. 4. The surface of the buffer 20D to which the electrodes E1 and E2 are attached may be the bottom, with respect to gravity, surface of the buffer 20D. Also, the buffer 20B can be a porous material. The size of a hole of the porous material is, for example, in units of microns so that the fuel supplied to the buffer 20B can be uniformly distributed in the buffer 20B regardless of the environment in which the fuel cell is used. The buffer 20B may have a variety of shapes.

Also, when a valve (not shown) is additionally provided to regulate the flow of fuel between the actuator 20C and the fuel diffusion plate 40, the control circuit 20D can directly control the value with the same principle as that for controlling the actuator 20C.

Figure 5:
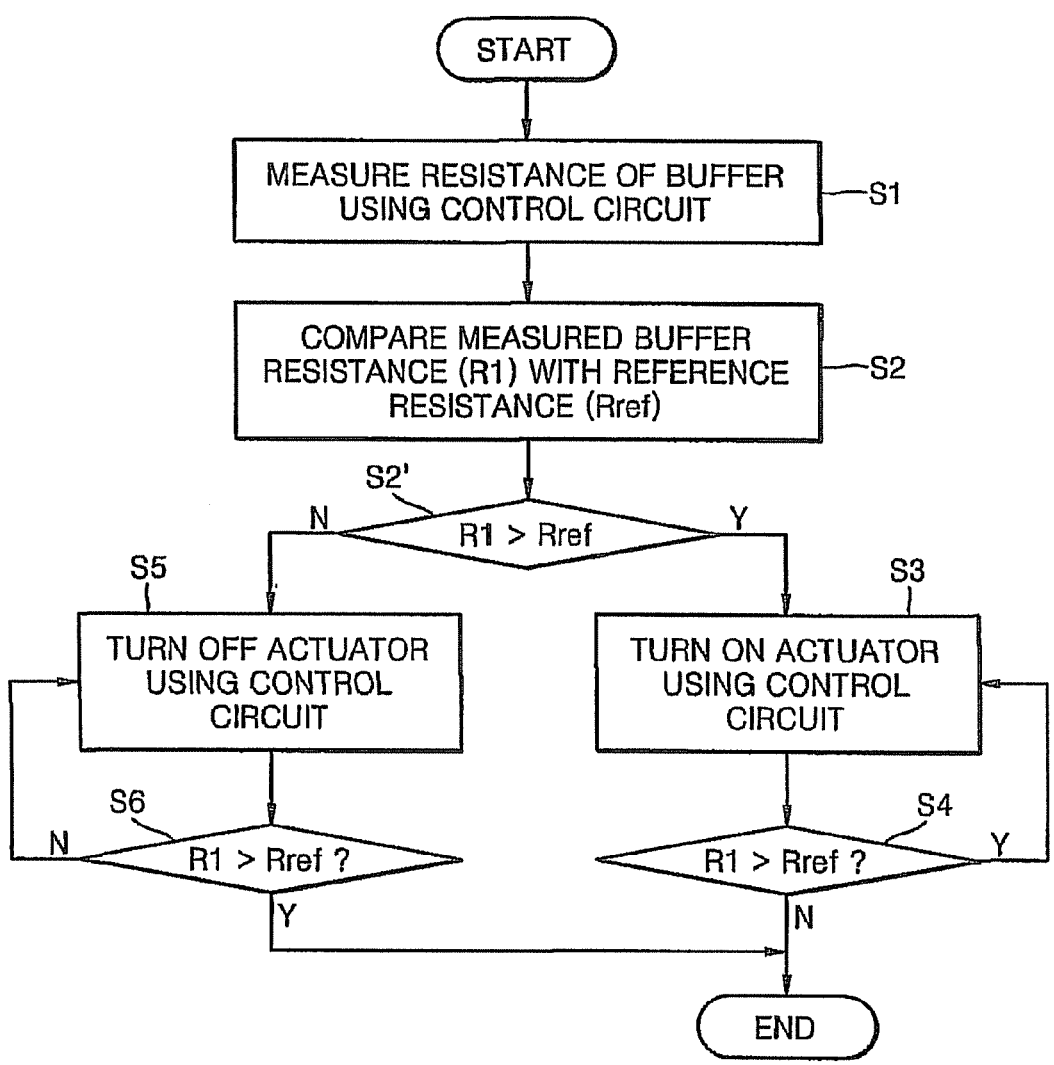
FIG. 5 is a flowchart showing an operational method among the buffer, the actuator, and the control circuit of the fuel cell of FIG. 2.

The operation method of a fuel cell according to aspects of the present invention configured as above will be herein described. FIG. 5 is a flowchart showing an operational method among the buffer 20B, the actuator 20C, and the control circuit 20D of the fuel cell of FIG. 2. Referring to FIGS. 3 and 5, in the operation method according to aspects of the present invention, first, a resistance R1 of the buffer 20B is measured using the control circuit 20D (S1). The measured resistance R1 of the buffer 20B is then compared to a reference resistance Rref that is previously input to the control circuit 20D. The comparison of the reference resistance Rref and the measured resistance R1 results in the determination of whether the measured resistance R1 is greater than the reference resistance Rref (S2 and S2').

When the measured resistance R1 is determined to be greater than the reference resistance Rref in the operations S2 and S2' (Y), the control circuit 20D applies an operational signal to the actuator 20C for a predetermined time to operate the actuator 20C (S3). Then, the measured resistance R1 is compared with the reference resistance Rref to determine which one is greater (S4). If the measured resistance R1 is still greater than the reference resistance Rref (Y), then S3 is repeated.

If the measured resistance R1 is not greater than the reference resistance Rref in the operations S2 and S2' (N), that is, the measured resistance R1 is equal to or less than the reference resistance Rref, the control circuit 20D stops the operation of the actuator 20C (S5). Then, the measured resistance R1 is compared with the reference resistance Rref to determine which one of the measured resistance R1 and the reference resistance Rref is greater (S6). If the measured resistance R1 is still not greater than the reference resistance Rref (N), the S5 is repeated. The non-operational state of the actuator 20C continues until the measured resistance R1 becomes greater than the reference resistance Rref.

In the operation S3, the operational signal applied to the actuator 20C can be applied for the first time period t1 as described above with reference to FIG. 3. Also, the non-operational state of the actuator 20C can be maintained for the second time period t2 as described above with reference to FIG. 3.

In the above operation method, other physical properties of the volume of fuel in the buffer 20B may be used. For example, instead of measuring the resistance of the buffer 20B, current may be measured and the measured current can be compared to a reference current.

While aspects of this invention have been particularly shown and described, it will be understood by those skilled in the art that various changes in form and details may be made therein without departing from the spirit and scope of the invention as defined by the appended claims. For example, those skilled in the art can modify the constituent elements of the fuel cell system, for example, the structure of the actuator or the cartridge, while maintaining the technical concept according to aspects of the present invention. Also, in FIG. 3, the buffer 20B can be divided into two or more, and the fuel diffusion plate 40 can be divided into the same number.

As described above, the fuel cell according to aspects of the present invention includes the control circuit which measures the resistance of a buffer, compares the measured resistance with a reference resistance, and controls the operation of the actuator. Thus, according to aspects of the present invention, by appropriately setting the reference resistance, the amount of fuel supplied from the buffer to the fuel cell stack can be regularly controlled within a given range. When the fuel cell is to be turned off, the fuel cell can be operated to reduce the amount of fuel remaining in the buffer to a particular level.

Since the amount of fuel supplied from the buffer to the fuel cell stack can be regularly controlled within a given range, the output of the fuel cell can be stably maintained in the given range. Also, the insufficient or excessive supply of the fuel to the fuel cell stack can be prevented.

Furthermore, when the fuel cell is in the off state, since the amount of fuel remaining in the buffer can be reduced to a particular level, the degradation of performance of the fuel cell stack due to the reaction by the fuel remaining in the fuel cell can be prevented while increasing the efficiency of fuel use.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A fuel cell, comprising:
    a fuel cell stack for generating power and consuming a fuel therein;
    a buffer that supplies the fuel to the fuel cell stack and that stores at least a predetermined amount of the fuel for the fuel cell stack;
    an actuator that provides the fuel to the buffer through a fuel diffusion plate attached to a side of the buffer; and
    a control circuit that controls an amount of the fuel supplied from the actuator to the buffer such that the buffer stores at least the predetermined amount of the fuel for the fuel cell stack, wherein:
    the control circuit controls an operation of the actuator according to a reference resistance value and a resistance value, and
    the resistance value corresponds to a volume of the fuel disposed in the buffer and is based on a current flowing through the buffer when a predetermined voltage is applied to at least two electrodes spaced apart in the buffer on the side of the buffer having the fuel diffusion plate attached thereto.

2. The fuel cell of claim 1, wherein the fuel cell stack is one of a monopolar stack and a bipolar stack.

3. The fuel cell of claim 1, wherein:
    the control circuit controls the operation of the actuator by controlling an on state and an off state of the actuator based on a comparison of the reference resistance value and the resistance value corresponding to the volume of fuel disposed in the buffer;
    the actuator in the on state provides the fuel to the buffer from a fuel storage cartridge; and
    the buffer includes a fuel storage medium to temporarily store at least the predetermined amount of the fuel prior to providing at least a portion of the predetermined amount of the fuel to the fuel cell.

4. The fuel cell of claim 3, wherein the buffer has a plate shape, a box shape, or a cylindrical shape.

5. The fuel cell of claim 3, wherein:
    when the resistance value is greater than the reference resistance value a first signal is applied from the control circuit to the actuator to activate the on state; and
    when the resistance value is less than the reference resistance value a second signal is applied from the control circuit to the actuator to activate the off state.

6. The fuel cell of claim 3, wherein the actuator is maintained in the off state until the measured resistance value is greater than the reference resistance value.

7. A method of operating a fuel cell including a fuel cell stack that generates power and consumes a fuel therein, a buffer that supplies the fuel to the fuel cell stack and that stores at least a predetermined amount of fuel for the fuel cell stack, and an actuator that provides the fuel to the buffer through a fuel diffusion plate attached to a side of the buffer, the method comprising:
    controlling a fuel supply operation of the actuator through the fuel diffusion plate to the buffer according to a reference resistance value and a resistance value such that the buffer stores at least the predetermined amount of fuel for the fuel cell stack;
    measuring the resistance value corresponding to a volume of the fuel disposed in the buffer, the resistance value being measured in the buffer and being based on a current flowing through the buffer when a predetermined value is applied to at least two electrodes spaced apart in the buffer on the side of the buffer having the fuel diffusion plate attached thereto;
    comparing the measured resistance value to a reference resistance value; and
    operating the actuator according to a result of the comparison.

8. The method of claim 7, wherein the resistance value of the volume of the fuel disposed in the buffer is measured using a control circuit.

9. The method of claim 7, wherein the comparing of the measured resistance value to the reference resistance value is performed using a control circuit.

10. The method of claim 9, wherein:
    the control circuit controls the fuel supply operation of the actuator by controlling an on state and an off state of the actuator based on the result of comparing the measured resistance value to the reference resistance value; and
    the reference resistance value corresponds to a minimum volume of fuel disposed in the buffer necessary to maintain the actuator in the off state.

11. The method of claim 7, wherein the operating of the actuator comprises turning on the actuator for an on time when the measured resistance value is greater than the reference resistance value.

12. The method of claim 11, wherein the turning on of the actuator comprises:
    repeating the measuring of the resistance value of the volume of the fuel disposed in the buffer at the end of the on time; and
    repeating the comparing of the measured resistance value to the reference resistance value at the end of the on time.

13. The method of claim 11, wherein the comparing of the measured resistance value to the reference resistance value is performed using the control circuit.

14. The method of claim 11, further comprising:
    turning off the actuator at the end of the on time to allow the fuel to disperse in the buffer.

15. The method of claim 14, further comprising:
    repeating the comparing the measured resistance value to the reference resistance value after an off time; and
    repeating the operating the actuator according to a result of the comparison.

16. The method of claim 7, wherein the operating of the actuator comprises turning off the actuator for an off time when the measured resistance value is not greater than the reference resistance value.

17. The method of claim 16, wherein the turning off of the actuator comprises:
    repeating the measuring of the resistance value of the volume of the fuel disposed in the buffer at the end of the off time; and
    repeating the comparing of the measured resistance value to the reference resistance value at the end of the off time.

18. The method of claim 7 further comprising:
repeating the measuring the resistance value of the volume of the fuel disposed in the buffer at the end of an on time or an off time; and
repeating the comparing the measured resistance value to the reference resistance value at the end of the on time or the off time.

19. The method of claim 7, wherein:
the control circuit controls the operation of the actuator by controlling an on state and an off state of the actuator based on the result of the comparison;
the actuator in the on state provides the fuel to the buffer from a fuel storage cartridge; and
the buffer includes a fuel storage medium to temporarily store at least the predetermined amount of the fuel prior to providing at least a portion of the predetermined amount of the fuel to the fuel cell stack.

20. The method of claim 19, wherein operating the actuator using the control circuit includes:
applying a first signal from the control circuit to the actuator to activate the on state when the measured resistance value is greater than the reference resistance value; and
applying a second signal from the control circuit to the actuator to activate the off state when the measured resistance value is less than the reference resistance value.

21. The method of claim 19 wherein the actuator is maintained in the off state until the measured resistance value is greater than the reference resistance value.

\* \* \* \* \*